May 22, 1956
G. M. ATTURA
2,747,162
INSTRUMENT AND METHOD FOR CHECKING THE PERFORMANCE OF
SERVOMECHANISMS AND AUTOMATIC CONTROL SYSTEMS
Filed March 13, 1953
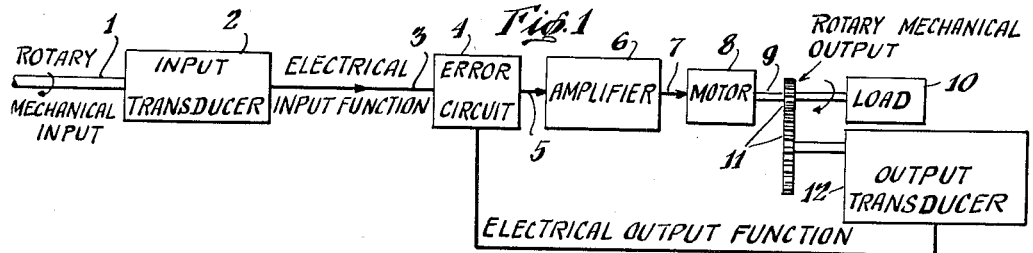
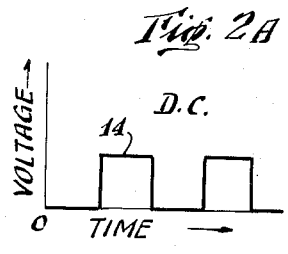
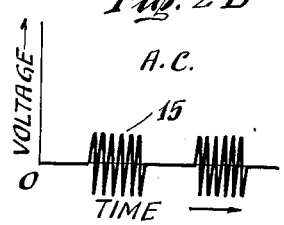
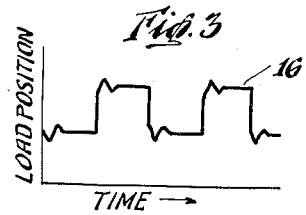
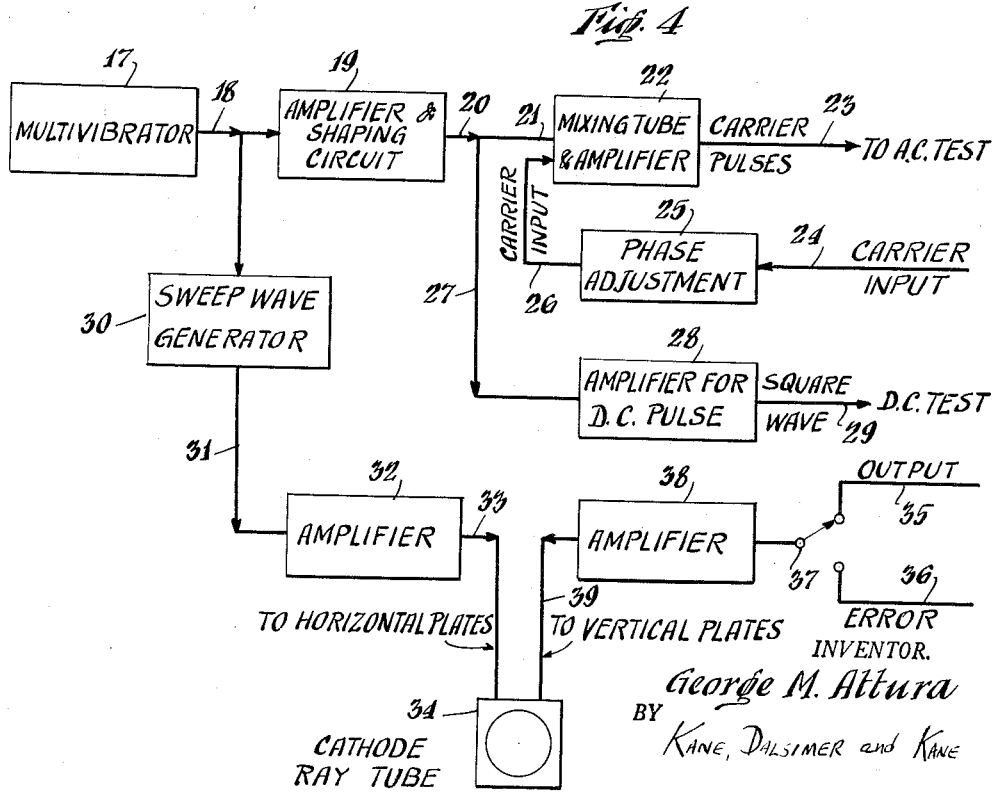
INVENTOR.
George M. Attura
BY
Kane, Dalsimer and Kane
ATTORNEYS

Fig.5

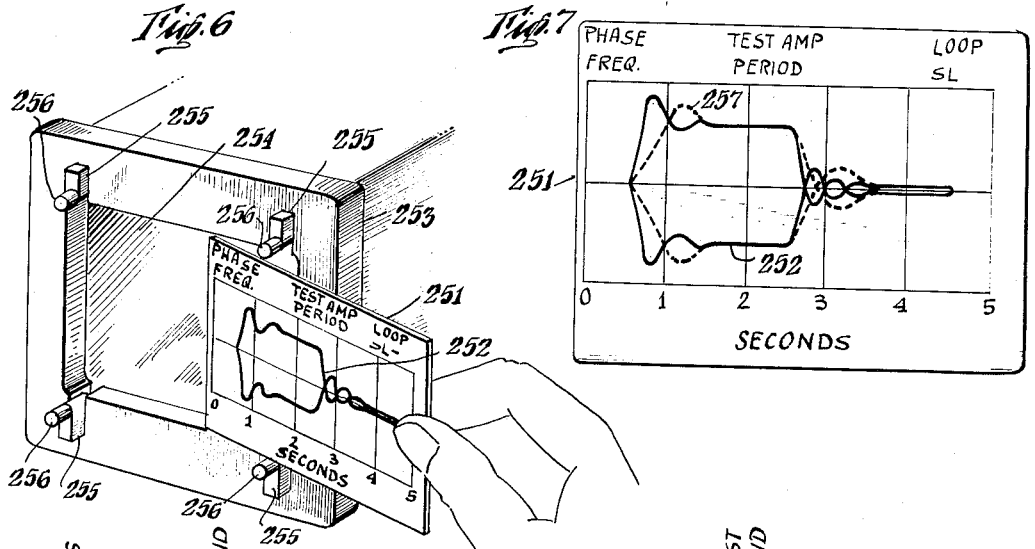
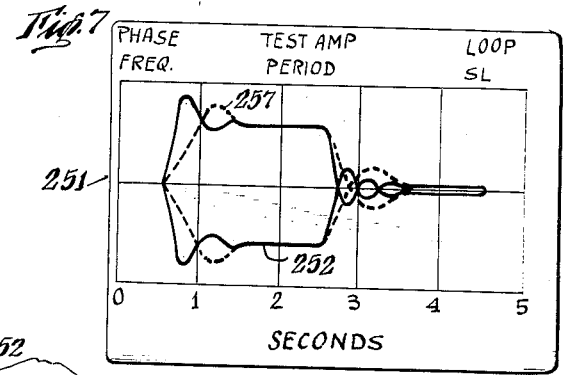
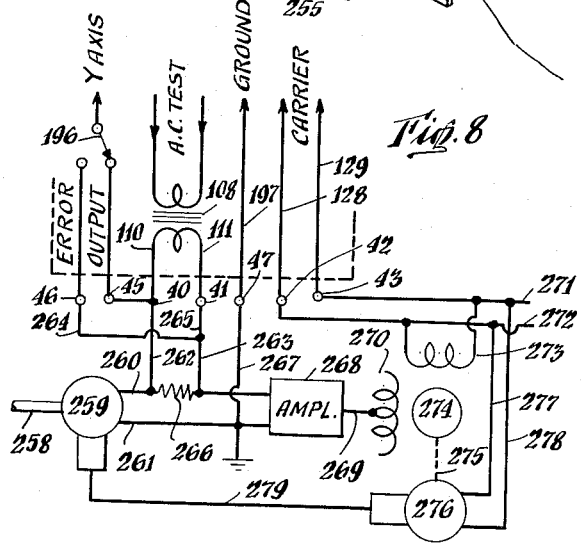
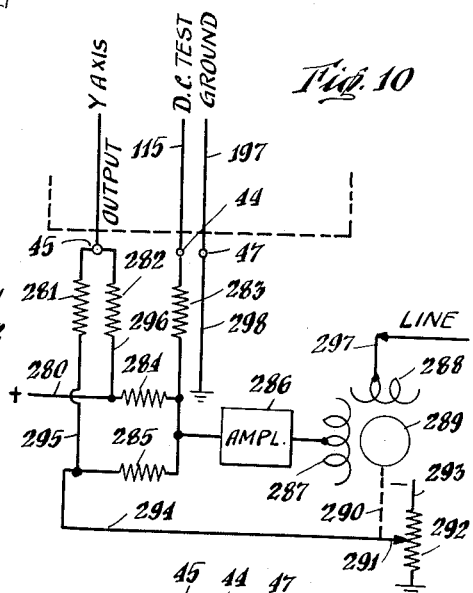
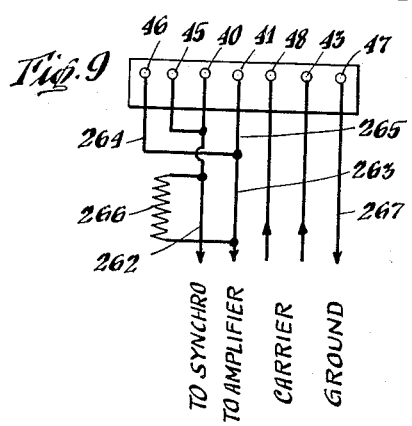
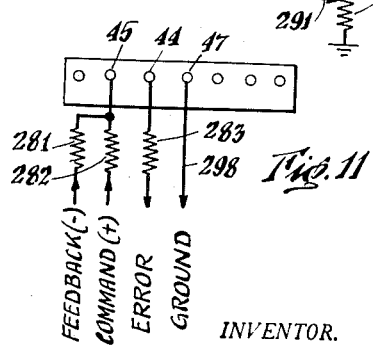

United States Patent Office 2,747,162
Patented May 22, 1956

2,747,162

INSTRUMENT AND METHOD FOR CHECKING THE PERFORMANCE OF SERVOMECHANISMS AND AUTOMATIC CONTROL SYSTEMS

George M. Attura, Levittown, N. Y.

Application March 13, 1953, Serial No. 342,158

7 Claims. (Cl. 324—158)

This invention relates to a method of testing and evaluating the performance of servomechanisms and automatic control systems at any time after their installation and to a device to be used for this purpose.

One of the objects of this invention is to provide a method and means for quick and easy testing of servomechanisms at their place of installation which can be utilized for any type of servomechanism whether it be on a radar, fire control equipments or industrial installations. The method and means utilizes predetermined knowledge of the performance characteristics of the servomechanism obtained at a time that the servomechanism was known to be in correct alignment, such knowledge having come from thorough and extensive testing by trained engineering personnel at the time and place of the original installation.

Another object of this device is to provide a portable device for testing servomechanism performance which can be used by maintenance or technician personnel, with the one device so designed that it is sufficient to test most servomechanisms interchangeably.

Another object of the invention is to provide a method and means for testing servomechanisms which can be used while the servomechanism is in actual operation.

Another object of the invention is to provide a device which will enable maintenance or technician personnel to perform simple adjustments to the operating characteristics of a servomechanism in order to align one that is not operating properly.

The details of this invention are disclosed in the below description together with the accompanying drawings. These drawings are as follows:

Fig. 1 is a block diagram of a typical servomechanism loop.

Figs. 2A and 2B show the forcing voltages utilized in this invention for testing servomechanisms with direct current and carrier frequency data systems respectively.

Fig. 3 shows graphically a typical servomechanism response to forcing voltages of the type shown in Figs. 2A and 2B.

Fig. 4 is a block diagram of the circuits utilized for carrying out this invention.

Fig. 5 is a circuit diagram of the preferred form of testing circuit.

Fig. 6 depicts the insertion of a mask as used in this invention in the front of the cathode ray tube shown in the testing circuit.

Fig. 7 depicts a typical mask in use.

Fig. 8 and 9 are circuit and schematic drawings showing how the testing device can be electrically connected to a carrier frequency servomechanism for testing.

Figs. 10 and 11 are circuit and schematic drawings showing how the testing device can be electrically connected to a direct current servomechanism for testing.

The general theory of operation of a servomechanism loop is well known. Excellent disclosures of the principles behind servomechanism operation are set forth in such texts as: G. S. Brown & D. P. Campbell, "Principles of Servomechanisms," Wiley & Sons, N. Y.; H. M. James, N. B. Nicols, R. S. Phillipps, "Theory of Servomechanisms," McGraw-Hill Book Company, N. Y.; H. Lauer, R. Lesnick, L. Matson, "Servomechanisms Fundamentals," McGraw-Hill Book Company, N. Y.

The servomechanism as shown in Fig. 1 is essentially an electromechanical feed back loop that establishes some functional correspondence between its input and output variables. Thus in Fig. 1 a rotary mechanical input is introduced at 1. This is converted by the input transducer 2 into a corresponding electrical input function 3. This is fed into an error circuit 4 which compares the input function 3 with an electrical output function 13 and which transmits the difference function 5 to an amplifier 6. The amplified difference function 7 actuates a motor 8 which, through shaft 9, moves the motor in correspondence with the initial mechanical input 1. The output of the motor is referred to in this drawing as the rotary mechanical output 9; it drives load 10 through a suitable set of gearings 11. The rotary mechanical output is monitored by the output transducer 12. This output transducer operates comparably to the input transducer 2 converting the output motion into an electrical output function 13. As previously stated the electrical output function 13 is fed into the error circuit 4 to be compared with the electrical input function 3.

In theory, then, if the loop parameters are proper the rotary mechanical output position will be exactly the same as the rotary mechanical input even though there is no mechanical connection between the two. The rotary mechanical output will compare favorably under both static and dynamic conditions. In practice, however, there are numerous factors introducing error into the operation, and it is to the testing and correction of these that this invention is directed.

The errors to be found in servomechanisms generally fall into four categories. First, there are static errors, that is the difference in position between the final mechanical input and the final mechanical output. Secondly, there are errors due to velocity lags when the mechanical output, resulting from constant velocity input is at the same velocity as the input but lags behind it during the operation. Thirdly, there are errors in the mechanical output when an input disturbance of a step function nature is present. These are called transient response errors. Fourthly, errors are introduced when a sinusoidal periodic function drives the servo input; these will show themselves in the phase and amplitude responses of the output member. Without attempting to enumerate all the causes of the above errors a few of them are friction, linkage, backlash and eccentricities of the gears used, the accuracy of the transducers, the damping characteristics of the entire system, the frequency response of the amplifier circuit and mechanical components and the saturation of these various components. A discussion of the various errors found in servomechanism performance will be found in an article written by this applicant entitled "Evaluating servomechanisms performance," printed in the Proceedings of the National Electronics Conference, Chicago, 1948.

The present invention is based upon the idea of using a known forcing voltage to displace the servomechanism from its proper position and having a means for comparing the resulting output transient excursion with that which would be obtained when the servomechanism is operating properly. This forcing voltage is added to the error voltage from the data system, whether the servo is at rest or in motion. The invention will operate in the latter case when the servomechanism is in constant velocity operation as with radar scanning or the like, and, in this case the signal which is used for comparison purposes may be the error function 5 rather than the electrical output function 13.

For this forcing voltage a step function is preferably used, thus allowing, if necessary correlation of the resultant pattern with the known body of transient response data. Transient response tests are preferable over the frequency response tests since they will disclose in one sweep the damping and sensitivity of the loop, and these two factors determine all the misalignment errors. If a transient were not used, the next best test would be use of sinusoidal functions but in that case a series of observations throughout the significant spectrum of the loop would be necessary which would require a longer test time.

Turning to Figs. 2A and 2B, Fig. 2A discloses graphically the types of forcing voltage which will be utilized for testing a direct current servomechanism. This forcing voltage would be applied to the circuit either as an added input 5 to the amplifier 6 or as an input 7 to the motor 8 as shown in Fig. 1. For direct current servomechanisms this forcing voltage would take the square wave shape disclosed by 14 in Fig. 2A. When alternating current servomechanisms are being tested, the forcing voltage applied to the loop is a carrier wave modulated by a square wave, as shown by 15 in Fig. 2B, and is applied as with the direct current servomechanims. It can be seen that the step function used is the envelope of a modulated carrier wave. The carrier frequency would be the carrier frequency utilized by the particular servomechanism under test. Further details of the method of applying the forcing voltages to servomechanism loops will be considered below.

Fig. 3 illustrates a typical rotary mechanical output 16 which might be obtained through the use of the forcing voltages illustrated in Figs. 2A and 2B. It shows graphically the load position plotted against time. It is seen that the load position is not a simple step function in accordance with the step function input but rather is out of alignment part of the time. In the case illustrated the lack of alignment results from the inertias and/or other energy storage elements in the loop. The output transducer 12 of the servomechanism loop, would, of course, except for errors in the output transducer itself, create a voltage corresponding to the load position. By means of the invention the voltage obtained from the output transducer 12 is utilized to ascertain the instantaneous alignment of the servomechanism loop under test. Under such circumstances the electrical output function 13 and the error function 5 should repeat themselves as long as the servomechanism remains in the same alignment and new errors do not arise. Thus, when either of these functions is impressed upon a cathode ray screen, so that they may be observed visually, the wave form should remain constant. In this invention, as will be described further below, a mask 251 showing the correct wave formation 252 is placed over the cathode ray screen 254 in order that such a comparison may be made.

Turning to Fig. 4 we see the basic circuit diagram for the testing circuit illustrated in block diagram form. In this circuit a multivibrator of the usual type 17 generates a wave which is substantially a square wave. This wave is identified by the number 18. This wave 18 is led to an amplifier and shaping circuit 19 and to a sweep wave generator 30. The amplifier and shaping circuit 19 serves to shape the square wave 18 into the more theoretically ideal form of square wave as is shown by 14 in Fig. 2A and identified by number 20 in Fig. 4. Square wave 20 is led to amplifier 28 to produce the proper step function for the testing of direct current servomechanisms, identified by 29 in Fig. 4 and 14 in Fig. 2A. The square wave 20 is also mixed with a carrier wave of the frequency utilized in whatever carrier frequency servomechanism is to be tested, in mixing tube and amplifier 22. The output of this stage 22 is a series of cycles 23 of the carrier wave. This output is illustrated as wave formation 15 in Fig. 2B. It is utilized for the testing of alternating current servomechanisms. The carrier wave utilized for this mixing is obtained, as will hereinafter be described, from the servomechanism data circuits themselves and is illustrated in Fig. 4 as the carrier input 24. Carrier input 24 is adjusted for phase in the phase adjustment circuit 25 and after being so adjusted, identified as wave 26, is then mixed with the square wave 20 as previously described.

The circuit of Fig. 4 has inputs 35 and 36 for the electrical output function 13 and the error function 5, respectively. These are alternatively fed into amplifier 38 through the single pole double throw switch 37. The amplified output wave 39 is fed into the vertical plates of cathode ray tube 34 thus creating the deflection upon the Y-axis of the cathode ray tube 34. The square wave 18 generated by the multivibrator 17 is also led into the sweep wave generator 30 where it is used to time the frequency of saw tooth sweep waves 31 generated. These waves 31 are amplified in amplifier 32 and, as amplified waves 33, are led into the horizontal plates of cathode ray tube 34, thus controlling the deflection in that tube on the X-axis in a sweep fashion and at the identical frequency as both the forcing voltages 23 and 29 and as the input voltages 35 and 36.

Figure 5:
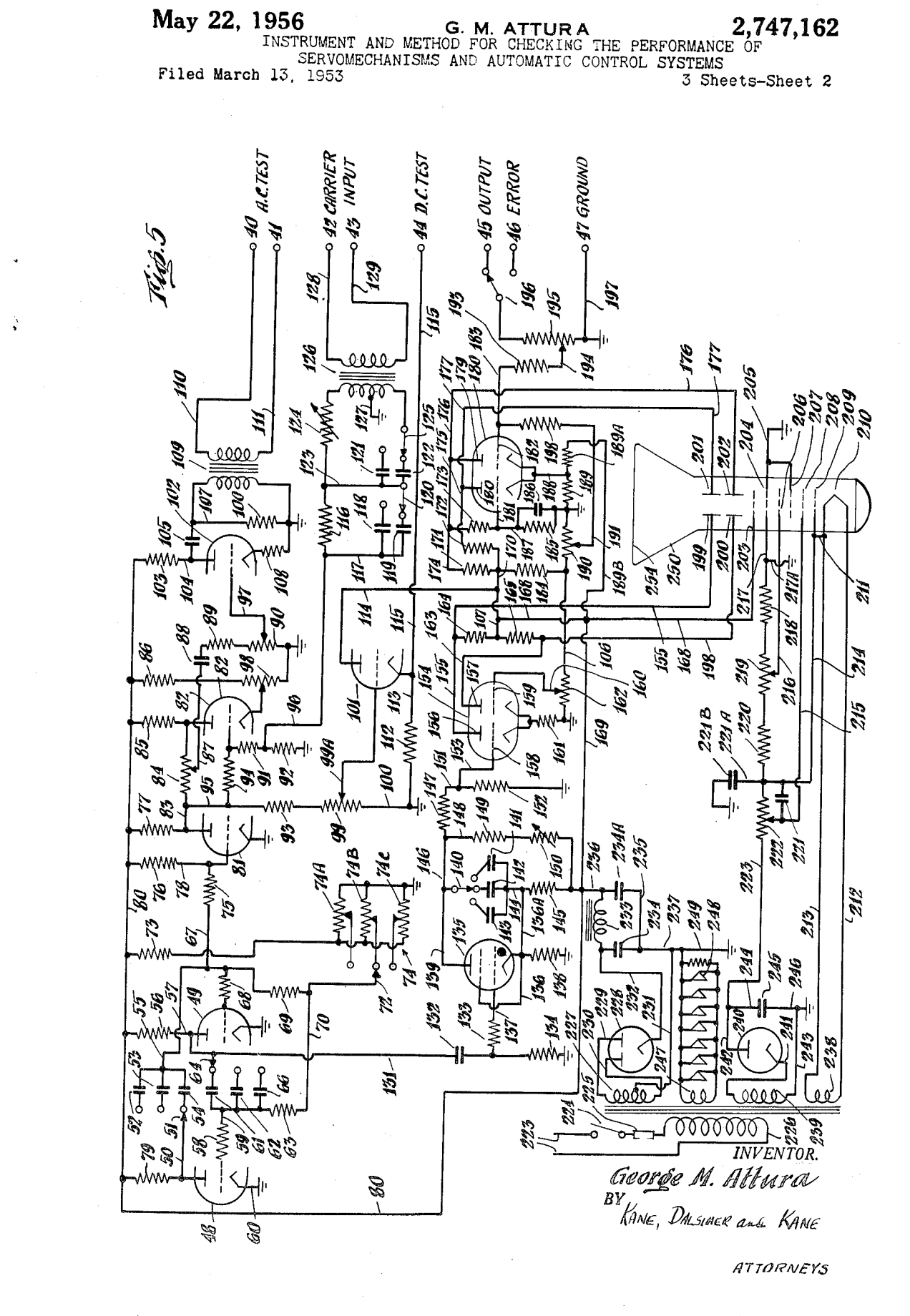

In Fig. 5 is shown the circuit diagram illustrating the preferred design for the testing circuits to be utilized. The multivibrator circuit itself is of the usual type. It utilizes two triodes 48 and 49 preferably in a double triode type tube such as 12AU7. The plate voltage used in the circuit is 300 volts positive direct current voltage and, as will be described below, is generated in a power supply circuit and impressed upon wire 80. The triodes 48 and 49 obtain their plate voltage from line 80 through resistances 79 and 56 each of 30,000 ohms. The cathodes of these tubes are grounded as shown. The plate of tube 48 is connected through wire 50 and multiple switch 51 to one of the capacitances 52, 53 and 54 which are 1.0 microfarad, 0.25 microfarad and 0.047 microfarad, respectively. The other terminal of these capacitances is connected through lead 55 and the 100 ohm resistance 68 to the grid of tube 49. The plate of tube 49 is connected through wire 65 and multiple switch 64 to capacitances 61, 62 and 66 which are 0.047 microfarad, 0.25 microfarad and 1.0 microfarad, respectively. The opposite terminals of these capacitances is connected through lead 59 and the 100 ohm resistance to the grid of tube 48. The grids of both tubes 48 and 49 are also connected through their respective grid resistances 58 and 68 through the 2 megohm resistances 63 and 69 and leads 70 and 71 to the multiple switch 72 and thus to one of the 50,000 ohm variably tapped resistances 74A, 74B, and 74C. Resistance 73 is in series with resistances 74A, 74B, and 74C and together lead from the plate voltage line 80 to ground as shown. Resistance 73 is preferably of 50,000 ohms.

This multivibrator circuit operates in the usual manner. The plate voltage of each triode is fed to the grid of the other triode so that the circuit acts as a relaxation oscillator.

The plate voltages of both tubes are approximate square waves, and any one of them can be tapped for such an output voltage. The different capacitances 52, 53, 54, 61, 62, and 66 enable the operator to vary the RC constant of the circuit and thus vary the timing of that circuit and the frequency of the output voltages. The three adjusting potentiometers, 74A, 74B, and 74C trim the frequency of the output voltages to the exact value required. If desired, switch 72 may be ganged for this purpose to switches 51 and 64.

Wire 67 is connected ot the grid resistance 68 of tube 49 and leads to the 470,000 ohm resistance 75. Referring to Fig. 4, 18 would represent the wave form which is carried by this lead 67 from the multivibrator circuit previously described to the amplifier and shaping circuit identified by 19 in Fig. 4. This output from the multivibrator is coupled through resistance 75 to the grid of tube 81. Tube 81 is preferably a double triode of the 12AX7 type, the other half of the tube being identified by 82. The grid of tube 81 and resistance 75 are connected through wire 78 to the 22 megohm resistance 76 and then to the high voltage line 80. Tube 81 obtains its plate voltage from line 80 through the 470,000 ohm resistance 77 as illustrated. The cathode of the tube is grounded. This half of the double triode serves to shape the grid wave to the more theoretical ideal square wave and its output is obtained through wire 83 connected to the plate of tube 81. The plate is also led to ground through wires 83 and 95 and series resistances 93 and 99, which are 10 megohms and 2.5 megohms respectively.

The output of tube 81 is carried by wires 83 and 95 to 2 megohm resistance 94 and thus to the grid of tube 82. The output is also led through wire 83 to the variably tapped resistance 84 to the plate of tube 82. Tube 82 serves to mix and amplify the carrier voltage and the square voltage for the purpose of creating the forcing test voltage as illustrated in Fig. 2B, for testing carrier frequency servomechanisms. The carrier voltage, obtained as hereinafter described, is led through wire 96 to the connection between series resistances 91 and 92 which are 270,000 ohms and 33,000 ohms respectively. Series resistances 91 and 92 are connected as shown in Fig. 5 between the grid of tube 82 and ground. Thus a mixing of the square wave obtained from tube 81 and the carrier wave is obtained at the grid of 82.

The plate of tube 82 is connected to the plate voltage 80 through the 265,000 ohm plate resistance 85. The cathode of tube 82 leads to the variable tap of resistance 98. Resistances 86 and 98 30,000 ohms and 5,000 ohms respectively are in series between the high voltage line 80 and ground. The variable tap connected to the cathode of tube 82 serves to allow adjustment of the grid bias of that tube.

Tube 82, therefore, operates as follows: the voltage applied to the grid of that tube is a superimposition of the carrier wave upon the square wave. The adjustment of parameters here is such that when the square wave goes negative it cuts off the conductivity of tube 82. When positive, tube 82 conducts and accordingly produces a pulse of carrier frequency of uniform amplitude for the period of the positive half cycle. The output of tube 82 is obtained through the variable tap 87 of 2.5 megohm resistance 84 and is led through the 0.047 microfarad coupling condenser 88 through resistances 89 and 90 to ground. Resistance 89 is 5.6 megohms and 90 is 2.5 megohms. Resistance 90 is variably tapped by lead 97 which conducts a portion of the output voltage of tube 82 to the grid of triode 102.

Triode 102 is one half of the double triode 101—102 preferably of the 12AU7 type. Triode 102 is utilized to amplify the output of tube 82 in the usual manner. Its plate voltage is obtained from line 80 through the 27,000 ohm plate resistance 103 and lead 104 connected to its plate. The cathode of that tube is led to the ground through 2,700 ohm resistance 108. The amplified output of tube 102 is led through coupling condenser 102 of 0.22 microfarad capacity through lead 107 and 56,000 ohm resistance 106 to ground. There is an output transformer 109 with its primary connected across resistance 106. The secondary of transformer 109 is connected through leads 110 and 111 to pins 40 and 41 as will hereinafter be described. Connections are made with pins 40 and 41 when it is desired to test alternating current servomechanisms and the forcing voltage obtained therefrom for the test from taps 40 and 41 is a square wave modulated carrier frequency.

The carrier frequency found in the output at terminals 40 and 41 must be of the same frequency as that of the data system of the servomechanism being tested. It is, therefore, preferably obtained directly from the servomechanism loop. As will be described below this carrier frequency is led from the servomechanism loop to the carrier input terminals 42 and 43. Wires 128 and 129 connect terminals 42 and 43 with the primary of transformer 126. The secondary of transformer 126 is connected to a phase shifting bridge and thus to lead 96 and the grid of tube 82 as heretofore described. The phase shifting bridge is designed as follows: one terminal of the secondary of transformer 126 leads to 25,000 ohm variable resistance 126 which is variably self-tapped at 124A. The other terminal of transformer 126 is connected to single pole double throw switch 125 and thus to either condensers 121 or 122, which are 0.047 microfarad and 0.22 microfarad respectively. The opposite terminals of these condensers 121 and 122 are both connected through line 123 to resistances 124 and 116 as shown. The opposite terminals of these two condensers are also connected to single pole double throw switch 120 which connects them either to condenser 118 or 119. The opposite terminals of condensers 118 and 119 are connected to wire 117 and thus to wire 96. Resistance 116 is connected across condensers 118 and 119 through leads 117 and 123. Resistance 116 is one megohm, resistance 124 is 25,000 ohms, and condensers 118 and 119 are 0.0022 microfarad and 0.01 microfarad, respectively. The secondary of transformer 126 is center tapped by lead 127 and led to ground. The circuit thus described in this paragraph accordingly effects a phase shifting bridge of the usual nature. By varying variable resistance 124 and the positions of switches 120 and 125, the phase of the carrier frequency obtained from the carrier input terminals 42 and 43 through transformer 126 is shifted to match the phase of the error voltage in the servo's data system. As previously stated the carrier frequency obtained from this bridge is mixed with the square wave obtained from tube 81 and amplified to create the forcing voltage for the alternating current servomechanism tests.

As has been disclosed above, part of the square wave output of tube 81 is led from the plate through leads 83 and 95 to series resistors 93 and 99 and through lead 100 to ground. Consequently with a square wave voltage being impressed upon the resistance 99 such voltage can be obtained from that resistance for the purpose of generating a square wave voltage for use in a forcing voltage in testing the direct current servomechanisms. Such a voltage is illustrated by 14 in Fig. 2. As shown in Fig. 5 resistance 99 is variably tapped at 99A and the voltage thus obtained impressed upon the grid of triode 101. Triode 101 serves to reproduce the voltage impressed upon its grid in the cathode circuit, but at a much lower impedance level. The cathode of triode 101 is connected through lead 113 and 47,000 ohm resistance 112 to ground. The plate voltage for triode 101 is obtained through leads 114, 168 and 169 as shown. Lead 169 is connected to the plate voltage supplied in a manner to be hereinafter described, as is lead 80. The output from triode 101 is taken from the cathode through lead 115 to terminal 44. Terminal 44 is connected as will be described below to direct current servomechanisms for the purpose of testing.

Terminals 45 and 46 shown in Fig. 5 are to receive the signal from the servomechanism which indicates the performance being obtained. Depending upon the circumstances of the test the total output voltage can be introduced at terminal 45 or the error function at terminal 46 and the testing circuits set for one or the other through switch 196. The output function introduced at 45 would be the equivalent of the electrical output function 13 as shown in Fig. 1. The error function put into the circuit at 46 would be the equivalent of the error function 5 shown in Fig. 1. Terminal 47 is for the purpose of having a neutral ground between the testing circuit and the servomechanism under test.

The input voltage passes through switch 196 and the 1.0 megohm resistance 195 to ground. Resistance 195 has a variable tap 194 to adjust the amplitude of the voltage utilized. Tap 194 leads through the two megohm resistance 193 to the grid 182 of the double triode tube 178 which is preferably of the 12AX7 type. This double triode is wired as to be a push-pull amplifier of the usual type. Bias for the grid 182 is obtained through the resistance 192, lead 191 and variably tapped resistance 190 and resistance 184. It will be seen that resistances 184 and 190 provide a series connection between the high voltage potential through leads 169, 168 and 170 and ground. Resistances 192, 190 and 184 are preferably 2 megohms, 250,000 ohms and 2 megohms respectively. Plate 179 of tube 178 obtains its plate voltage from wire 170 also but through the 470,000 ohm resistance 171. Wire 178 leads from both cathodes of tube 178 to the junction point of the 4700 ohm resistance 189 and the 470,000 ohm resistance 189A. As shown, resistances 189 and 189A are connected in series from ground to the high voltage potential through wires 169 and 189B. This series arrangement with its connection to the cathode establishes the potential of the cathodes in tube 178. Resistances 189 and 189A are 4700 ohms and 470,000 ohms respectively. Grid 181 of tube 178 is connected to the plate of the other side of the tube 179 through the voltage divider made up of resistances 173 and 185 and condenser 186, which are 10 megohms and 180,000 ohms resistors, and 200 micro-microfarads respectively, thus applying a grid voltage to grid 181 one hundred and eighty degrees out of phase with the voltage applied to grid 182. Plate 180 is connected to its plate voltage through wires 169, 168 and 170 in series with the 470,000 ohm plate resistance 172. Output voltages from the two plates of tube 178 are led to the vertical deflection plates of the cathode ray tube 250. Thus, plate 179 is led through lead 176 to vertical deflecting plate 202, and plate 180 is led through lead 177 to vertical deflecting plate 201. Due to the push-pull arrangement of the amplifier of tube 178 the voltages applied to plates 201 and 202 are one hundred and eighty degrees out of phase.

Thus it can be seen that the error output voltage from the servomechanism under test is led into the connecting circuit, amplified and impressed upon the vertical plates, i. e. the Y-axis, of the cathode ray tube where it may be observed on the face of the tube 254.

In order that there will be the proper horizontal sweep on the cathode ray tube 250 and in order that the test will yield the same pattern from the same servomechanism at different times, the testing circuit provides for the generation of a sweep voltage of the same frequency of the multivibrator circuit itself. Lead 131, being connected through wire 65 to the plate of tube 49, carries a square wave, as is generated by the multivibrator circuit made up of tubes 48 and 49. This voltage is differentiated by means of condenser 132 and resistance 134 connected as shown in Fig. 5. Condenser 132 is 0.001 microfarad and resistances 133 and 134 are 270,000 ohms and 470,000 ohms respectively. Differentiation of this square wave results in sharp pulses of voltage, of alternately positive and negative polarity. This voltage is led from resistance 133 through lead 137 to the control grid of gas filled tube 135, preferably of the 2050 type. The positive spike of this voltage serves to trigger the gas filled tube into conduction. The cathode of tetrode 135 is connected to ground through 4,700 ohm resistance 138. The screen grid of the tube is connected to the cathode through lead 136. The plate voltage of the tube is connected to the plate voltage supply, to be described below, by lead 236 through lead 146, one megohm resistance 149, and 2.5 megohm variable resistance 150. In parallel with the plate resistances 149 and 150 are alternate capacitances 141, 142 and 143 through sweep condenser switch 140, lead 144 and the 100,000 ohm resistance 145. For ease of operation, switch 140 is preferably ganged with multivibrator condenser switches 51 and 64. Resistances 145 and 138 are connected through lead 136A as is shown in Fig. 5. The condensers 141, 142 and 143 which may be used alternatively are respectively 0.5 microfarad, 2 microfarads, and 10 microfarads. In operation tube 135 and its associated circuit generate a saw tooth sweep wave as follows. The potential from lead 236 builds up a charge upon whichever one of the three condensers 141, 142 or 143 is connected by switch 140. The rate at which this charge builds up is controlled by the RC constant of the circuit. Before the potential across the condenser is sufficient to cause tube 135 to "fire" and thus become conducting, a positive pulse is introduced to the control grid causing the tube to fire slightly earlier. Once the tube has become conducting its internal resistance decreases substantially instantaneously and the charged condenser discharges through the tube. After the condenser has become discharged and its potential drops, the tube once again becomes non-conducting and the cycle repeats itself with the condenser charging as before.

Thus the voltage of the plate of tube 135 is a slowly increasing voltage followed by a sudden drop to its original voltage i. e. a saw tooth sweep wave. This potential is taken from the plate by leads 139 and 146 and coupled to the grid 158 the push-pull amplifier of tube 154 through the 22 megohm resistance 147 and lead 153. Resistance 147 is connected to ground through lead 151 and the 10 megohm resistance 152. Tube 154 is a double triode preferably of the 12AU7 type. The sweep wave grid voltage for grid 153 of that tube is obtained through lead 153 tapped in the junction of resistance 147 and 152, as stated. The plate voltage for plate 156 of tube 154 is obtained through the 100,000 ohm resistance 146 connected to the plate voltage supply through leads 167, 168 and 169. Both cathodes of the tube are connected to ground through the 10,000 ohm resistance 161. The grid voltage for the grid 159 of tube 154 is obtained through variable tap 160 of resistance 162 and serves to set the bias conditions in the tube. The potential at tap 160 is that resulting from the connection in series between the power supply voltage at 168 and 170 of resistances 184 and 162 with ground. Resistance 162 is preferably 250,000 ohms. The plate voltage for plate 157 is obtained from leads 168 and 167 through the 270,000 ohm plate resistance 165 and lead 163.

The sweep voltage thus amplified is led to the horizontal deflection plates 199 and 200 of cathode ray tube 250 through lead 155 coming from plate 156 and leads 198 and 163 coming from plate 157. This voltage then is applied to the X-axis of the cathode ray tube.

The power supply for this testing circuit is of a relatively conventional nature and is depicted in the lower left corner of Fig. 5. The two input lines are shown in 223 and are preferably supplied by the usual 110 to 115 volt alternating current source. A single pole, single throw switch 224 and a fuse 225 are in series with one of the lines 223 leading to the primary of transformer 226. This transformer has four secondary windings 227, 247, 239 and 238. Secondary 227 is connected through leads 229 and 230 to the plates of the full wave rectifier tube 228 preferably of the 6X4 type. Secondary 227 is center tapped and grounded through leads 231 and 249. The output of tube 228 is led from the cathode to the filter circuit by lead 232. The filter circuit is of the conventional type consisting of choke 233 and two 20 microfarad condensers 234 and 234A. The condensers are grounded in the usual manner through leads 235, 237 and 249. The output from the filtering circuit is obtained through lead 236 which connects with leads 80 and 169. It is approximately 300 volts direct current. Secondary 247 and the associated circuits as shown in Fig. 5 represent in schematic fashion the heaters 248 of the various tubes in the circuit. It is of the usual type.

Secondary 239 and its associated circuits is used to produce the necessary high voltage direct current for the cathode ray tube 250. The side of secondary 239 is grounded through lead 243 and the other is connected by lead 241 to the cathode of rectifier tube, 240 preferably of the 2X2A type. The plate of this tube is connected through lines 242 and 244 through the 0.5 microfarad condenser and lead 246 to ground. The plate of tube 240 also is connected through leads 242 and 223 to series resistances 222, 220, 219, and 218 and then to ground through lead 217A as shown in Fig. 5. These resistances are respectively 250,000 ohms, 470,000 ohms, 500,000 ohms, and 1.41 megohms. The intensifier anode 203 of the cathode ray tube 250 is directly connected to the 300 volt plate supply voltage through leads 168 and 169. Grid Nos. 2 and 4, 204 and 207, are grounded through lead 205. Grid No. 3 206 obtains its voltage through lead 216 from the variable tap on resistance 219 as shown in the drawing. Grid No. 5 208 obtains its voltage through lead 215 from the variable tap on resistance 222. This variable tap is also connected to the junction between resistances 222 and 220 by the 0.22 microfarad condenser 221. This same junction is also grounded by lead 221A passing through the 0.1 microfarad condenser 221B. Grid No. 6 209 obtains its voltage from the same junction between resistances 222 and 220 by means of line 214. Grid No. 6 is also connected with the cathode 210 through lead 211. The cathode obtains its heating voltage from the secondary 238 through leads 212 and 213.

By means of the above-described testing circuit certain wave forms may be obtained on the screen of the cathode ray tube, which through proper interpretation, enable one to determine the operating characteristics of the servomechanism under test. The means for this determination is shown in Figs. 6 and 7.

Turning to Fig. 6 we see a representation of the front of the cathode ray tube 254 as it is mounted in the unit with the testing circuit. There is a frame 253 mounted around and in front of the face of the tube. Fastened to this frame are four rotatable shafts 256 having lugs thereon 255. A mask 251 can be inserted within the opening in the frame 253 and secured in position by the lugs 255 which are rotated on shafts 256 so that they are over the corners of the mask. Fig. 6 shows a mask being inserted into the frame so that it will cover the cathode ray tube.

The mask 251 has on its face a tracing 252 of the wave form which has been observed on the cathode ray screen during an earlier test on equipment judged to be operating properly. Preferably the tracing 252 is made on the mask with ink at the time of a test made immediately after the initial installation or at a time when it has been established by extensive testing that the servomechanism is operating properly. Thus the wave formation depicted by the tracing 252 represents a permanent record of how the servomechanism will respond to a known set of transient conditions if it is operating properly. The mask 251 may be made of any transparent material such as glass, Celluloid, or the various plastics now available.

Since it is essential that the conditions of the test be the same as were the conditions at the time the original tracing was recorded on the mask, the mask is ordinarily and preferably made up with a series of blanks on one side which show the various data as to phase adjustments, frequency of the carrier wave (if an alternating current servomechanism is the object of the test), the amplitude of the forcing voltage and the period of the forcing voltage. Some means of identification of the servomechanism loop being tested should also be on the mask. Thus, by merely having additional masks, one for each servomechanism, the testing circuits and devices here disclosed can be used to test numerous servomechanisms interchangeably. This feature is a valuable aspect of this invention.

Fig. 7 shows the face of the mask 251 during a test. The solid line 252 represents the tracing which has been previously placed on the mask, and the dotted line 257 the wave formation observed on the cathode ray screen. Preferably a cathode ray tube should be used which has a relatively long persistence. In the example shown in Fig. 7 the servomechanism under test is out of alignment. If it were in alignment, the wave formation on the cathode ray tube would be coincidental with the tracing on the mask. When this latter occurs the observer can be certain that the servomechanism is operating properly and is in alignment.

To facilitate the testing of various servomechanisms interchangeably it is preferable to have the terminals 40, 41, 42, 43, 44, 45, 46 and 47 of Fig. 5 lead to a plug on the testing unit whereby it may be connected to a cable which leads to a corresponding plug on the servomechanism. The connections at the servomechanism itself can be permanently installed and need not interfere with the normal operation of the servomechanism.

Figs. 8 and 9 disclose the connections which are used for the testing of a carrier frequency servomechanism. It will be seen that for this test only the following terminals will be connected: the terminals to the carrier frequency forcing voltage 40 and 41, the carrier input terminals 42 and 43, the error and output terminals 45 and 46 and the mutual ground terminal 47. In Fig. 8 the rotary input shaft 258 is comparable to the rotary mechanical input of Fig. 1 259 is the synchro or input transducer. Leads 260 and 261 ordinarily lead from the synchro to the amplifier 268, but lead 260 has been interrupted by the 20,000 ohm resistance 266. Leads 269 connect the amplifier 268 with the control phase 270 of the servo-motor represented generally by 274. The servo-motor is mechanically connected through 275 to the output synchro 276 and the output function is fed back into the synchro 259 by the leads 279. The alternating current input voltage for the carrier of the servomechanism is introduced through lines 271 and 272 to the fixed phase 273. It is also fed to the output synchro through 277 and 278. The operation of a carrier frequency servomechanism loop such as this is well known in the art and has been described in numerous references such as those cited above. The carrier frequency is introduced into the testing circuit from leads 271 and 272 through terminals 42 and 43 and through leads 128 and 129 previously described. The mutual ground is attached to line 261 as in the ordinary servomechanism circuit and is connected to the testing circuit through line 267, terminals 47 and line 197. Leads 262, 263, and 265 connect terminals 40 and 41 with the opposite ends of the 20,000 ohm resistance 266 as shown in Fig. 8 for the purpose of superimposing the forcing voltage upon the voltages already in the circuit. Terminals 40 and 45 are connected directly so that the output voltage showing the instantaneous position of the servomechanism resulting from the forcing voltage can be fed into the testing circuit. This, of course, would be possible only when switch 196 is set so as to lead the output voltage into the testing circuit. The error terminal 46 is connected through wire 264 to the leads 265 and 263 running from the terminal 41 to the resistance 266. Accordingly, when it is desired to utilize the error rather than the output voltage for testing purposes switch 196 is placed in that position, and a voltage representing the difference between the input carrier voltage and the output voltage then is fed into the testing circuit.

Fig. 9 shows more or less schematically the connections necessary on the servo test receptacle installed on the servo under test, to which receptacle the cable from the testing circuit connects, whereas Fig. 8 shows, in addition, these connections together with the most pertinent connections found in the servomechanism loop.

A preferred method of connecting the testing circuit to a direct current servomechanism loop is disclosed in Figs. 10 and 11. In Fig. 10 the input function to the servomechanism is through lead 280 and in the servomechanism loop shown is a source of positive potential which varies according to the mechanical input. This potential is led through summing resistance 284 of the loop and thence to the amplifier 286. The amplified output is applied to control phase 287 of servomotor 289. The fixed phase 288 is depicted as obtaining line voltage through line 297. The position of the servo motor 289 is mechanically imparted to the output transducer made up of negative potential source 293 grounded resistance 292 and the variable tap 291 as shown in Fig. 10. The output voltage obtained by variable tap 291 is connected through lead 294 to the other summing resistance 285 which is also connected to the input of amplifier 286 as shown. Thus the input amplifier 286 is the error difference between the input 280 and the output voltage 291, plus the forcing voltage described below. This forcing voltage from the testing circuit is fed to the servomechanism loop through lead 115 and terminal 44 of the unit. Terminal 44 is connected to the 10 megohm resistance 283 which is fed into the input of the amplifier and in effect displaces the output from its correct position. The voltage showing the response of the servomechanism is obtained through summing resistances 281 and 282 each of 2 megohms. Two megohm resistance 281 connects the output terminal of the testing unit 45 with the output voltage obtained through terminal 291 and lead 294. This is summed at the terminal 45 through 2 megohm resistance 282 connected to terminal 45 and through line 296 to the input line 280. Thus it can be seen that the voltage fed to a terminal 45 will be proportional to the output shaft displacement under the influence of the forcing test voltage, plus any steady state difference such as may exist during periods of constant velocity of the input shaft.

Fig. 11 shows in more schematic form the actual connections to the servo test receptacle installed on the servo under test, and to which the cable from the testing circuit connects. Only terminals 44, 45 and 47 are utilized. 47 which is connected to line 197 in the testing circuit itself goes through line 298 to ground and effects a mutual ground between the two systems. Terminal 44 introduces the forcing voltage into the servomechanism loop through 10 megohm resistance 283. Terminal 45 of the testing circuit, which is connected through switch 196 to the associated amplification circuits and thus to the vertical plates of the cathode ray tube, is connected to the servomechanism loop through the 2 resistances 281 and 282 as previously described.

It can easily be seen that through these circuit arrangements both alternating and direct current servo-mechanisms can be permanently wired to a plug having the requisite number of terminals in order that the testing unit can be connected to the loop any time. Thus the testing circuit through the appropriate plugs and cables may be utilized to test as many servomechanisms as is desired. The only different equipment necessary for each test is a different mask 251, because each servomechanism must have its own mask having the proper tracing 252 to show the performance of that servomechanism when correctly aligned.

Review of the above descriptions clearly shows the method of testing servomechanisms by means of this invention and the circuits used. Prior to the making of any tests it is necessary to prepare the mask 251 with the tracing 252. This must be done at a time that the servomechanism is known to be operating properly and can be made either at the time of the initial installation of the servomechanism or immediately after the usual periodic and extensive tests have been made on a servomechanism to ascertain that it is operating properly. The mask is prepared by placing it in the frame 253 over the face of the cathode ray tube 254 and holding it thereon by rotating shafts 256 so that lugs 255 cover the corners of the mask, or by a similar arrangement. The testing circuit is then connected to the servomechanism loop as above described. The testing circuit is set for the proper conditions of the test to be made which will, of course, vary with the characteristics of the particular servomechanism involved by setting the various controls on the panel of the testing instrument. The switches 51 and 64 of the multivibrator circuit are also positioned as to utilize whichever of the condensers 52, 53, 54 and 61, 62 and 66 are necessary for the period of square wave desired.

If a direct current test is being made, variable tap 99a on resistance 99 must be set to predetermine the amplitude of the test voltage desired at terminal 44. There will then be an output forcing voltage introduced into the servomechanism which has substantially a step wave, i. e. square wave shape. This voltage will then subject the servomechanism to transient operation in addition to any output motion resulting from motion of the input shaft, if any.

The output function being observed is introduced through terminal 45 in the preferred circuit arrangement therefore switch 196 must be set in the position such as to connect resistance 195 with terminal 45. The amplification of this input to the amplifier circuit is adjusted by means of the variable tap 194 on resistance 195. The variably tapped resistance 190, is then set for proper vertical position of the image on the cathode ray tube screen. Tapped resistor 162 is set for proper horizontal position of the image on the cathode ray tube screen.

The sweep wave for the cathode ray tube 250, as has been previously described, is generated by means of gas filled tube 135 and the associated circuits. The condensers 141, 142 and 143, controlled by switch 140, which is ganged to switches 51 and 64, are chosen by the switch to give approximately equal sweep amplitudes regardless of the period chosen. Variable resistance 150 is utilized to adjust the total length of the sweep on the cathode ray screen. The sweep wave produced is amplified in the amplifier circuit associated with tube 145 and utilized to provide a sweep wave in cathode 250. Thus, a wave form is observed on the screen of the cathode ray tube.

With the blank mask 251 in place over the face of the tube a tracing showing the transient performance of the servomechanism can easily be made with pen and ink or similar means. This mask should show the various settings made of the test circuit and set in by the front panel controls and which servomechanism loop is being tested. It can then be retained as a permanent record of the proper performance characteristics of the loop under a given set of conditions. Whenever it is desired to see if the servomechanism loop is operating properly, it is necessary only to connect the test circuit to the servomechanism loop, place the proper mask over the face of the cathode ray tube and set the controls of the testing circuit to the same conditions as they were at the time the mask was made. If the servomechanism loop is in proper alignment and operating as it did when the tracing on the mask was made, then the wave form produced on the face of the tube wil lbe the same as the one on the mask. Thus, even inexperienced personnel can view this wave form and ascertain if the servomechanism is operating properly. As has been previously stated if the servomechanism is not in alignment the wave form shown on the screen will be out of alignment with the tracing on the mask, a typical example of this being shown on Fig. 7.

For testing carrier frequency servomechanisms the ganged switch 51, 64 and 140 is set as before. In addition, the amplitude of the output forcing voltage obtained at terminals 40 and 41 is set through variablly tapped resistance 90 and the phase of the carrier frequency utilized is adjusted by use of the phase shifting bridge and in particular by the setting of switch 120, 125 and variable resistance 124. Ordinarily the adjustments made to variable resistances 84 and 98 can be effected at the time of manufacture and need not be changed thereafter. The testing circuit is connected to the carrier frequency servomechanism loop as previously described, and the output function utilized for the test may be either the error function obtained at terminal 46 or the output function obtained at terminal 45. Switch 196 is set to adjust that, and variably tapped resistance 195 is set to control the amplitude. As with the direct current servomechanisms the mask must be made initially at a time that the servomechanism is known to be performing properly. It can then be used in the same manner as described above for testing direct current servomechanisms for the testing of carrier frequency servomechanisms.

The variably tapped resistances 221 and 219 in the grid circuits associated with the cathode ray tube ordinarily set the brightness and the focus of the image on the cathode ray tube screen.

As can be easily seen, this circuit and method may be utilized by inexperienced personnel to align servomechanisms which are not operating properly, in addition to its use for testing. Thus, if the test shows that the device is not in proper alignment, as in Fig. 7, the operator may make simple adjustments to the servomechanism loop in an effort to vary the cathode ray image so that it aligns itself with the mask tracing 252. Ordinary adjustments can easily be made to damping and gain controls of the servomechanism loops if so provided, and, if, by varying them the operator can align the two tracings 252 and 257 which he sees, then it will be unnecessary to call in engineering personnel to repair the device.

Having fully described the use and operation of my invention, I claim:

1. An apparatus for use in the testing and alignment of servomechanisms by comparison of the wave shape of the voltage obtained from the position of said servomechanism with the comparable wave shape so obtained when said servomechanism is operating in known proper alignment: comprising means for generating a square wave voltage of a pre-determined frequency in a pair of thermionic tubes arranged in a multivibrator circuit, means for amplifying and shaping one portion of said square wave voltage and impressing it upon said servomechanism, leads connected with the said servomechanism for obtaining from said servomechanism a second voltage functionally related to the position of said servomechanism, a thermionic amplifier circuit for amplifying the said second voltage, a cathode ray tube having two sets of deflecting plates, means for connecting said amplified second voltage with one set of said deflecting plates, means for differentiating a second portion of said square wave voltage, a gas-filled tube having a cathode, at least one grid, and a plate in parallel relationship with a condenser so arranged as to constitute a saw-tooth wave generator, means connecting said differentiating means with said grid of said gas-filled tube whereby said saw-tooth wave generator may be triggered by the differentiated voltage of said second portion to create a saw-tooth wave of the same frequency as the said square wave, means for connecting said saw-tooth wave with the other set of said deflecting plates whereby the wave form of said second voltage may be observed, and a transparent mask mounted over the face of said cathode ray tube, said mask having thereon a tracing of the wave-form of a voltage comparable to said second voltage and made at a time that the servomechanism under test was known to be operating properly.

2. An apparatus for use in the testing and alignment of servomechanisms by comparison of the wave shape of the voltage obtained from the position of said servomechanism with the comparable wave shape so obtained when said servomechanism is operating in known proper alignment: comprising means for generating a square wave voltage of predetermined frequency in a pair of thermionic tubes arranged in a multivibrator circuit, means for amplifying and shaping one portion of said square wave voltage, means for introducing a carrier frequency voltage, means for modulating said carrier frequency voltage with the said portion of said square wave voltage and for impressing it upon said servomechanism, leads connected with the said servomechanism for obtaining from the output of said servomechanism a second voltage functionally related to the position of said servomechanism, a thermionic amplifier circuit for amplifying the said second voltage, a cathode ray tube having two sets of deflecting plates, means for connecting said amplified second voltage with one set of said deflecting plates, means for differentiating a second portion of said square wave voltage, a gas-filled tube having a cathode, at least one grid, and a plate in parallel relationship with a condenser so arranged as to constitute a saw-tooth wave generator, means connecting said differentiating means with said grid of said gas-filled tube whereby said saw-tooth wave generator may be triggered by the said differentiated second portion to create a saw-tooth wave of the same frequency as the said square wave, means for connecting said saw-tooth wave with the other set of said deflecting plates whereby the wave form of said second voltage may be observed, and a transparent mask mounted over the face of said cathode ray tube, said mask having thereon a tracing of the wave-form of a voltage comparable to said second voltage and made at a time that said servomechanism was known to be operating properly.

3. The method of aligning servomechanisms which comprises generating a pre-determined forcing voltage of pre-determined frequency, impressing said voltage on the servomechanism to be aligned, impressing a voltage obtained from said servomechanism and functionally related to the position of said servomechanism on a cathode ray tube to create an observable wave-form on the face of said cathode ray tube, and adjusting the parameters of the servomechanism loop until the said observable wave-form is similar to a second wave-form traced on a transparent mask mounted on the face of said cathode ray tube, said second wave-form being the wave-form obtained from said servomechanism under the same conditions as with the said observable wave-form except at a time when said servomechanism was known to be in proper alignment.

4. Apparatus for testing servomechanisms including a cathode ray tube having sets of horizontal and vertical plates, a mask mounted on the face of said cathode ray tube, a circuit for generating a servomechanism forcing voltage having pre-determined characteristics, a second circuit operatively connected with said first circuit for generating a sweep-wave voltage for said tube and for connecting it to one of said sets of plates, said last-named voltage having a frequency functionally related to the frequency of said forcing voltage, conducting means for connecting said forcing voltage generating circuit to said servomechanism, and conducting means for connecting said servomechanism to the other said set of plates of said tube whereby voltages produced by said servomechanism and functionally related to the position of said servomechanism may be depicted on said tube, and said mask having a tracing thereon representing the wave form produced upon said cathode ray tube by the servomechanism under test at a time when said servomechanism was known to be in proper alignment and when said servomechanism was being subjected to a pre-determined forcing voltage equivalent to the aforesaid forcing voltage.

5. The combination including a series of independent servomechanism systems; servomechanism testing apparatus including a cathode ray tube having sets of horizontal and vertical deflection plates, a first circuit for generating a pre-determined forcing voltage, and a second circuit operatively associated with said first circuit for generating a sweep-wave voltage for said tube and for connecting it to one of said sets of plates, said last-named voltage having a frequency functionally related to the frequency of said forcing voltage; means for selectively electrically connecting said testing apparatus with any of said servomechanism systems to impress said forcing voltage upon said selected system and to receive from said selected system and impress on the other set of said plates a voltage functionally related to the position of the servomechanism in said servomechanism system; a series of masks, one for each of said servomechanism systems, each said mask being made of transparent material and having a tracing thereon conforming to the wave form depicted on the face of said cathode ray tube when said testing apparatus has been interconnected to the respective said servomechanism system at a time when said system was known to be operating in proper alignment; and means for disposing over the face of said tube any one of said series of masks.

6. A coupling circuit for interconnecting a direct current servomechanism loop to be tested and a testing circuit, said servomechanism loop including an input resistance carrying a control potential to the input of an amplifier and an output resistance connected between the output transducer of said servomechanism loop and said amplifier input, said testing circuit including means for generating pre-determined forcing voltages and an output circuit to receive test signals from said servomechanism, said coupling circuit including a first summing resistance connected between the amplifier side of said input and output resistances and said generating means, a second summing resistance connected between the opposite side of said input resistance and said output circuit, and a third summing resistance connected between the opposite side of said output resistance and said output circuit.

7. A coupling circuit for interconnecting an alternating current servomechanism loop to be tested and a testing circuit, said testing circuit including means for generating a pre-determined modulated forcing voltage, and error and output circuits to receive test signals from said servomechanism, said servomechanism loop including an error circuit, said coupling circuit including a first resistance connected in series with the error circuit of said servomechanism loop, a first lead connected between one end of said first resistance and one side of the output of said forcing voltage generating means, a second lead connected between the other end of said first resistance and the other side of the output of said forcing voltage generating means, a third lead connecting said first lead to said error circuit, and a fourth lead connecting said second lead to said output circuit, whereby said servomechanism loop may be tested even when said servomechanism loop is in operation.

References Cited in the file of this patent

UNITED STATES PATENTS

| | | |
|---|---|---|
| 2,402,108 | Willard | June 11, 1946 |
| 2,570,738 | Wikkenhauser | Oct. 9, 1951 |
| 2,586,743 | Thresher | Feb. 19, 1952 |
| 2,612,626 | Miles | Sept. 30, 1952 |
| 2,625,599 | Downes | Jan. 13, 1953 |